United States Patent
Xie et al.

(10) Patent No.: US 10,203,551 B2
(45) Date of Patent: Feb. 12, 2019

(54) LIGHT GUIDE PLATE, BACKLIGHT MODULE AND DISPLAY DEVICE

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventors: Xiaoli Xie, Beijing (CN); Wentao Ying, Beijing (CN)

(73) Assignees: BOE TECHNOLOGY GROUP CO., LTD., Beijing (CN); BOE OPTICAL SCIENCE AND TECHNOLOGY CO., LTD., Jiangsu (CN)

(*) Notice: Subject to any disclaimer, the term of this patent is extended or adjusted under 35 U.S.C. 154(b) by 8 days.

(21) Appl. No.: 15/511,618

(22) PCT Filed: Sep. 2, 2016

(86) PCT No.: PCT/CN2016/097851
§ 371 (c)(1),
(2) Date: Mar. 15, 2017

(87) PCT Pub. No.: WO2017/118064
PCT Pub. Date: Jul. 13, 2017

(65) Prior Publication Data
US 2018/0231840 A1 Aug. 16, 2018

(30) Foreign Application Priority Data
Jan. 5, 2016 (CN) .......................... 2016 1 0003683

(51) Int. Cl.
*G02F 1/1335* (2006.01)
*F21V 8/00* (2006.01)

(52) U.S. Cl.
CPC ..... *G02F 1/133606* (2013.01); *G02B 6/0016* (2013.01); *G02B 6/0028* (2013.01);
(Continued)

(58) Field of Classification Search
None
See application file for complete search history.

(56) References Cited

U.S. PATENT DOCUMENTS 7,139,048 B2 * 11/2006 Han ............... G02B 6/0018
349/62
9,360,613 B2 * 6/2016 Sakai ............... G02B 6/0016
(Continued)

FOREIGN PATENT DOCUMENTS

CN 101042493 A 9/2007
CN 101078795 A 11/2007
(Continued)

OTHER PUBLICATIONS

International Search Report and Written Opinion in PCT/CN2016/097851 dated Nov. 30, 2016, with English translation. 17 pages.
(Continued)

*Primary Examiner* — Elmito Breval
(74) *Attorney, Agent, or Firm* — Womble Bond Dickinson (US) LLP (57) ABSTRACT

The present disclosure relates to the field of display technologies, and discloses a light guide plate, a backlight module and a display device, for improving light exit uniformity of the light guide plate and reducing occurrence of phenomenons such as brightness non-uniformity and intersecting light beams of the display device. A plurality of first light-diffusing units is disposed on a light incident surface of the light guide plate. At least one light-diffusing structure is disposed in a set region within the light guide plate in a direction facing away from the light incident surface. In the light guide plate, by disposing a plurality of first light-diffusing units and at least one light-diffusing structure on the light incident surface, light emitted from a light source can be better diffused after passing through the
(Continued)

light guide plate and become more uniform before entering the display panel.

18 Claims, 5 Drawing Sheets

(52) U.S. Cl.
CPC ..... *G02B 6/0051* (2013.01); *G02F 1/133603* (2013.01); *G02F 1/133604* (2013.01); *G02F 1/133611* (2013.01); *G02B 6/0025* (2013.01); *G02B 6/0075* (2013.01)

(56) References Cited

U.S. PATENT DOCUMENTS

| | | | | |
|---|---|---|---|---|
| 2004/0095743 A1* | 5/2004 | Yu | ............... | G02B 6/0036 362/613 |
| 2004/0125590 A1* | 7/2004 | Tsai | ............... | G02B 6/0038 362/625 |
| 2004/0130912 A1* | 7/2004 | Miyashita | ............... | G02B 6/002 362/561 |
| 2004/0145914 A1* | 7/2004 | Yu | ............... | G02B 6/0016 362/558 |
| 2005/0201121 A1* | 9/2005 | Chen | ............... | G01D 11/28 362/615 |
| 2006/0082884 A1* | 4/2006 | Feng | ............... | G02B 5/1814 359/569 |
| 2007/0139956 A1* | 6/2007 | Sugimoto | ............... | G02B 6/0055 362/600 |
| 2007/0139967 A1* | 6/2007 | Peng | ............... | G02B 6/009 362/617 |
| 2007/0236957 A1* | 10/2007 | Koganezawa | ............... | G02B 6/0036 362/561 |
| 2007/0274100 A1* | 11/2007 | Yang | ............... | G02B 6/0018 362/615 |
| 2007/0291510 A1* | 12/2007 | Chen | ............... | G02B 5/045 362/618 |
| 2008/0089092 A1 | 4/2008 | Lee et al. | | |
| 2008/0225554 A1* | 9/2008 | Ting | ............... | G02B 6/0035 362/620 |
| 2008/0285309 A1* | 11/2008 | Fang | ............... | G02B 6/0016 362/620 |
| 2009/0015753 A1* | 1/2009 | Ye | ............... | G02B 6/0015 349/64 |
| 2009/0046220 A1* | 2/2009 | Tsuchiya | ............... | G02B 6/0036 349/65 |
| 2010/0079980 A1* | 4/2010 | Sakai | ............... | G02B 6/0016 362/97.1 |
| 2011/0002144 A1* | 1/2011 | Park | ............... | G02B 5/02 362/620 |
| 2012/0081926 A1* | 4/2012 | Yu | ............... | G02B 6/0036 362/619 |
| 2013/0114300 A1* | 5/2013 | Lee | ............... | G02B 6/0038 362/620 |
| 2013/0208502 A1* | 8/2013 | Nakayama | ............... | G02B 6/0018 362/608 |
| 2013/0242231 A1* | 9/2013 | Kurata | ............... | G02B 6/0016 349/65 |
| 2014/0043859 A1* | 2/2014 | Yang | ............... | G02B 6/0011 362/623 |
| 2014/0132887 A1* | 5/2014 | Kurata | ............... | G02B 6/0018 349/65 |
| 2015/0036380 A1* | 2/2015 | Hu | ............... | G02B 6/002 362/608 |

FOREIGN PATENT DOCUMENTS

| | | |
|---|---|---|
| CN | 101749598 A | 6/2010 |
| CN | 101988686 A | 3/2011 |
| CN | 102661527 A | 9/2012 |
| CN | 103926645 A | 7/2014 |
| CN | 104011585 A | 8/2014 |
| CN | 105629370 A | 6/2016 |
| KR | 20140062323 A | 5/2014 |
| TW | 530919 | 5/2003 |

OTHER PUBLICATIONS

Office Action received for Chinese Patent Application No. 201610003683.5, dated Mar. 13, 2018, 11 pages (5 pages of English Translation and 6 pages of Office Action).

Office Action received for Chinese Patent Application No. 201610003683.5, dated Nov. 20, 2018, 17 paged (8 pages of English Translation and 9 pages of Office Action).

\* cited by examiner

LIGHT GUIDE PLATE, BACKLIGHT MODULE AND DISPLAY DEVICE

RELATED APPLICATIONS

The present application is the U.S. national phase entry of PCT/CN2016/097851, with an international filling date of Sep. 2, 2016, which claims the benefit of Chinese Patent Application No. 201610003683.5, filed on Jan. 5, 2016, the entire disclosures of which are incorporated herein by reference.

FIELD

This disclosure relates to the field of display technologies, and in particular to a light guide plate, a backlight module and a display device.

BACKGROUND ART

At present, backlight modules of liquid crystal display devices are mainly divided into a direct-down type and an edge-in type. An edge-in type of backlight module generally adopts a light guide plate. In this case, the light guide plate enables a linear light emitted from a backlight source to be converted into an area light. Therefore, the light guide plate is now a key part in a display device adopting an edge-in type of backlight module.

In recent years, with rapid development of the display field, "super-thinness", "highlighting", and "narrow frame" have become essential requirements of the high-end display market. But this will also cause some optical problems. For example, in order to improve brightness of the display, microstructure processing is performed on the light guide plate of the backlight source to increase the optical energy utilization. However, this can easily give rise to problems such as "intersecting light beams", for instance, intersecting light beams caused by condensation of a V-groove structure on a light exit surface of the light guide plate. Besides, due to a reduced size of the frame and inadequacy number of LED lamps, light emitted from an LED light source will enter an image region before it is sufficiently mixed. This has gone beyond the adjustable brightness range of nodes, which leads to brightness nonuniformity in front of the lamps in the image display region.

SUMMARY

The present disclosure provides a light guide plate, a backlight module and a display device, for improving light exit uniformity of the light guide plate and reducing occurrence of phenomenons such as brightness non-uniformity and intersecting light beams of the display device.

In one aspect, the present disclosure provides a light guide plate. A plurality of first light-diffusing units is disposed on a light incident surface of the light guide plate, and at least one light-diffusing structure is disposed in a set region within the light guide plate in a direction facing away from the light incident surface.

In the light guide plate as provided by embodiments of the present disclosure, by disposing a plurality of first light-diffusing units and at least one light-diffusing structure on the light incident surface, light emitted from a light source can be better diffused after passing through the light guide plate and become more uniform before entering the display panel. In this way, the light guide plate as provided by embodiments of the present disclosure can help to improve the light exit uniformity of the light guide plate and reduce phenomenons such as brightness non-uniformity and intersecting light beams of the display device.

In some optional embodiments, the set region is in a length range of 1.2 mm-2.8 mm from the light incident surface.

In some optional embodiments, the light-diffusing structure comprises hollow light-diffusing structures. A plurality of second light-diffusing units is disposed on at least one of the following: a surface of the hollow light-diffusing structures facing the light incident surface and/or a surface of the hollow light-diffusing structures facing away from the light incident surface. Specifically, the light-diffusing structure can be hollow light-diffusing structures. The second light-diffusing units can be disposed only on the surface of the hollow light-diffusing structures facing the light incident surface or on the surface facing away from the light incident surface. Alternatively, the second light-diffusing units can be disposed on both the surface of the hollow light-diffusing structures facing the light incident surface and the surface facing away from the light incident surface.

In some optional embodiments, each of the hollow light-diffusing structures has a depth of 0.5 mm-0.6 mm in a direction facing away from the light incident surface.

In some optional embodiments, the hollow light-diffusing structures comprise a single hollow light-diffusing structure disposed in an arrangement direction of a plurality of light sources. The plurality of light sources is configured to provide light incident on the light incident surface of the light guide plate. The single hollow light-diffusing structure has a length greater than or equal to a total arrangement length of the plurality of light sources in the arrangement direction of the plurality of light sources.

Alternatively, in some optional embodiments, the hollow light-diffusing structures and the plurality of light sources are the same in number and have one-to-one correspondence to each other in position. The plurality of light sources is configured to provide light incident on the light incident surface of the light guide plate. By arranging a plurality of hollow light-diffusing structures, the light exit uniformity of the light guide plate can be further improved.

In some optional embodiments, the plurality of first light-diffusing units disposed on the light incident surface of the light guide plate is arranged in an arc. Alternatively, the plurality of second light-diffusing units in the light-diffusing structure of the light guide plate is arranged in an arc.

In some optional embodiments, each of the first light-diffusing units comprises a microstructure. A projection of each of the first light-diffusing units on a plane perpendicular to the light incident surface of the light guide plate comprises at least one of the following shapes: a circular arc, an isosceles triangle, an isosceles trapezoid and a curve.

In some optional embodiments, when the projection of the first light-diffusing units on the plane perpendicular to the light incident surface of the light guide plate comprises a circular arc shape, the projection of the circular arc shape has a radius of 0.05 mm-0.06 mm. Alternatively, when the projection of the first light-diffusing units on the plane perpendicular to the light incident surface of the light guide plate comprises a curve shape, the projection of the curve shape satisfies the following sinusoidal function: $y = e \cdot \sin(f \cdot \phi)$, wherein e takes a value of 0.04 mm-0.06 mm, and $f$ takes a value of 1-4. Alternatively, when the projection of the first light-diffusing units on the plane perpendicular to the light incident surface of the light guide plate comprises an isosceles trapezoid shape, the projection of the isosceles trapezoid shape has a base angle of 30°-60° and a height of 0.03 mm-0.05 mm. Alternatively, when the projection of the first light-diffusing units on the plane perpendicular to the light incident surface of the light guide plate comprises an isosceles triangle shape, the light-diffusing unit of the isosceles triangle shape has a top angle of 60°-70° and a height of 0.03 mm-0.04 mm.

In some optional embodiments, the plurality of first light-diffusing units disposed on the light incident surface of the light guide plate has different shapes. The plurality of second light-diffusing units in the light-diffusing structure has different shapes. By using the first and second light-diffusing units of different shapes in combination, the light exit uniformity of the light guide plate can be further improved.

In another aspect, the present disclosure further provides a backlight module. The backlight module comprises: light sources, and any light guide plate as mentioned above. The plurality of light sources is configured to provide light incident on the light incident surface of the light guide plate. Since the above light guide plate has high light exit uniformity, the backlight module as provided by embodiments of the present disclosure also has high light exit uniformity.

In some optional embodiments, the backlight module further comprises: a back plate located on a side of the light sources facing away from the light guide plate, wherein a reflective layer is disposed on a side of the back plate facing the light sources. The reflective layer can be coated on a side of a light-diffusion sheet abutting the light guide plate, extending to the light source and completely covering an upper part of the light incident surface. Alternatively, the reflective layer can also be coated on an extended segment of a flexible circuit board, and it also needs to completely cover the upper part of the light incident surface. Thereby, light emitted from the light sources can be prevented from being emitted out before entering the image display region and becoming invalid light.

In some optional embodiments, each of the light sources is an LED lamp.

In still another aspect, the present disclosure further provides a display device. The display device comprises: a display panel and any backlight module as mentioned above. Since the above backlight module has good light exit uniformity, the display panel as provided by embodiments of the present disclosure also has good light exit uniformity.

BRIEF DESCRIPTION OF DRAWINGS

The drawings illustrated here are used to provide further understanding of the present disclosure and are part of the present disclosure. Illustrative embodiments of the present disclosure and explanations thereof are used for interpreting the present disclosure and will not unduly limit the present disclosure. In the drawings.

DETAILED DESCRIPTION OF EMBODIMENTS

Technical solutions according to embodiments of the present disclosure will be described below clearly and completely with reference to the drawings. Apparently, the described embodiments are only part of the embodiments of the present disclosure, instead of all. In the drawings, 1 indicates a light guide plate, 11 indicates a light incident surface, 2 indicates a first light-diffusing unit, 3 indicates a second light-diffusing unit, 4 indicates a light-diffusing structure and 5 indicates a light source.

Figure 1:
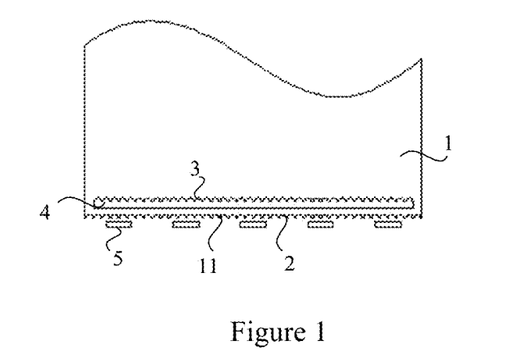
FIG. 1 is a schematic structure view of a light guide plate as provided in an embodiment of the present disclosure.
Figure 2:
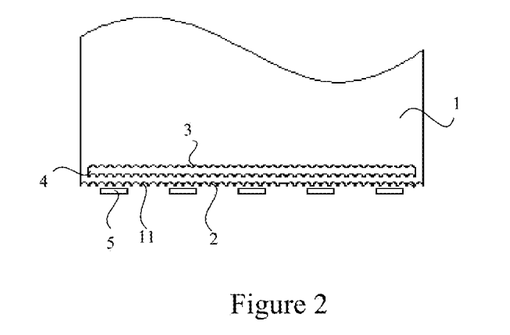
FIG. 2 is a schematic structure view of a light guide plate as provided in another embodiment of the present disclosure.
Figure 3:
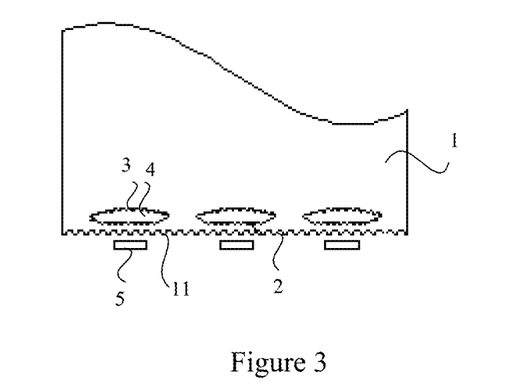
FIG. 3 is a schematic structure view of a light guide plate as provided in yet another embodiment of the present disclosure.

With specific reference to FIGS. 1, 2 and 3, FIG. 1 is a schematic structure view of a light guide plate as provided in an embodiment of the present disclosure; FIG. 2 is a schematic structure view of a light guide plate as provided in another embodiment of the present disclosure; and FIG. 3 is a schematic structure view of a light guide plate as provided in yet another embodiment of the present disclosure.

The present disclosure provides a light guide plate 1. A plurality of first light-diffusing units 2 can be disposed on a light incident surface 11 of the light guide plate 1. At least one light-diffusing structure 4 can also be disposed in a set region within the light guide plate 1 in a direction facing away from the light incident surface 11.

In the light guide plate 1 as provided by an embodiment of the present disclosure, by disposing a plurality of first light-diffusing units 2 and at least one light-diffusing structure 4 on the light incident surface 11, light emitted from a light source 5 can be better diffused after passing through the light guide plate 1 and become more uniform before entering the display panel. In this way, the light guide plate 1 provided in an embodiment of the present disclosure can help to improve the light exit uniformity of the light guide plate 1 and reduce phenomenons such as brightness non-uniformity and intersecting light beams of the display device.

Figure 14:
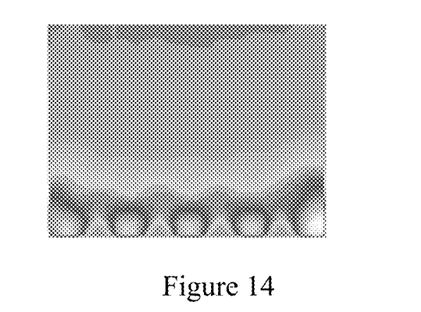
FIG. 14 is a diagram showing the light-diffusion effect of an existing light guide plate.
Figure 15:
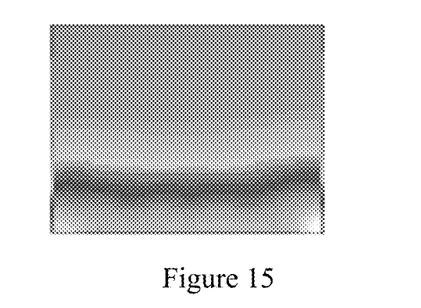
FIG. 15 is a diagram showing the light-diffusion effect of the light guide plate as provided in an embodiment of the present disclosure.

As a optional solution, the set region may be in a length range of 1.2 mm-2.8 mm from the light incident surface 11. In this case, the light-diffusion effect of the light guide plate may be the most uniform. With specific reference to FIGS. 14 and 15, FIG. 14 is a diagram showing the light-diffusion effect of an existing light guide plate; and FIG. 15 is a diagram showing the light-diffusion effect of the light guide plate as provided in an embodiment of the present disclosure. As can be known from a comparison between FIG. 14 and FIG. 15, the light-diffusion effect of the light guide plate as provided by the present disclosure is more uniform.

In a specific embodiment, as shown in FIGS. 1, 2 and 3, the light-diffusing structure 4 can specially comprise hollow light-diffusing structures. A plurality of second light-diffusing units 3 may be disposed on a surface of the hollow light-diffusing structures facing the light incident surface 11 and a surface of the hollow light-diffusing structures facing away from the light incident surface 11. The light-diffusing structure 4 can be hollow light-diffusing structures. Besides, the second light-diffusing units 3 can be disposed only on the surface of the hollow light-diffusing structures facing the light incident surface 11 or on the surface facing away from the light incident surface 11. Alternatively, the second light-diffusing units 3 can also be disposed on both the surface of the hollow light-diffusing structures facing the light incident surface 11 and the surface facing away from the light incident surface 11.

In an optional embodiment, the hollow light-diffusing structures may comprise a single hollow light-diffusing structure disposed in an arrangement direction of a plurality of light sources 5. The plurality of light sources 5 in this case is configured to provide light incident on the light incident surface 11 of the light guide plate 1. Moreover, the single hollow light-diffusing structure may have a length greater than or equal to a total arrangement length of the plurality of light sources 5 in the arrangement direction of the plurality of light sources 5.

In an optional embodiment, as shown in FIG. 3, the hollow light-diffusing structures and the plurality of light sources 5 are the same in number and have one-to-one correspondence to each other in position. Likewise, the plurality of light sources 5 can be configured to provide light incident on the light incident surface 11 of the light guide plate 1. By arranging a plurality of hollow light-diffusing structures, the light exit uniformity of the light guide plate 1 can be further improved.

Figure 4:
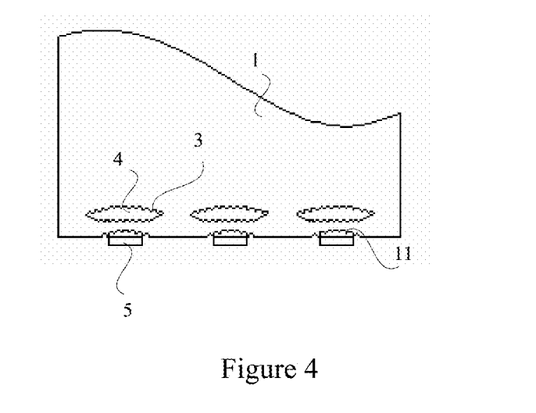
FIG. 4 is a schematic structure view of a light guide plate as provided in still another embodiment of the present disclosure.
Figure 5:
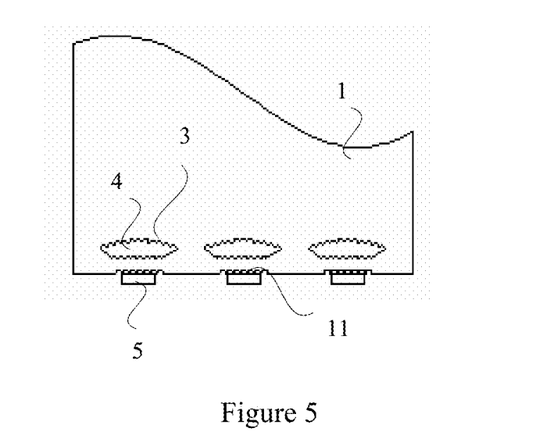
FIG. 5 is a schematic structure view of a light guide plate as provided in a further embodiment of the present disclosure.
Figure 6:
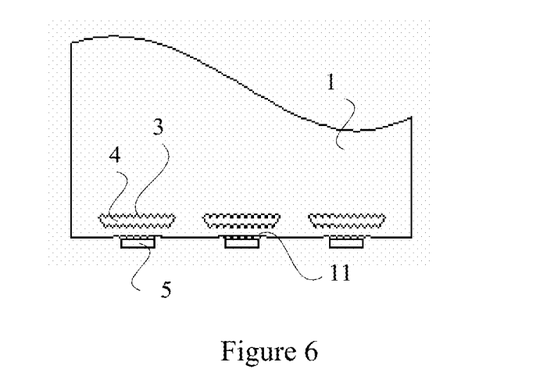
FIG. 6 is a schematic structure view of a light guide plate as provided in a still further embodiment of the present disclosure.

With further reference to FIGS. 4, 5 and 6, FIG. 4 is a schematic structure view of a light guide plate as provided in still another embodiment of the present disclosure; FIG. 5 is a schematic structure view of a light guide plate as provided in a further embodiment of the present disclosure; and FIG. 6 is a schematic structure view of a light guide plate as provided in a still further embodiment of the present disclosure. Specifically, the plurality of first light-diffusing units 2 on the light incident surface of the light guide plate 1 can be either consecutive or spaced. Moreover, the plurality of first light-diffusing units can be arranged either in an arc, or in a straight line.

Figure 7:
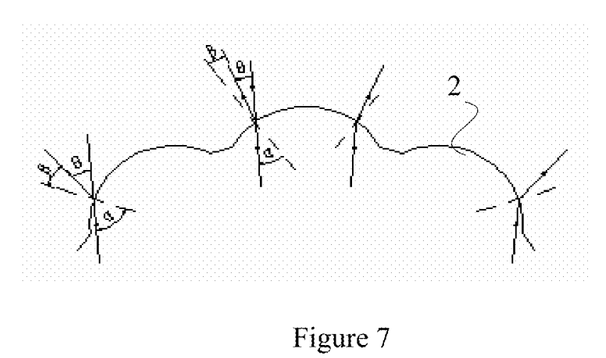
FIG. 7 is a schematic structure view of a plurality of first light-diffusing units arranged in an arc as provided in an embodiment of the present disclosure.
Figure 8:
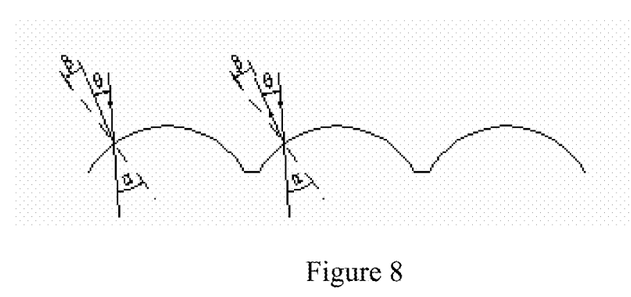
FIG. 8 is a schematic structure view of a plurality of first light-diffusing units arranged in a straight line as provided in an embodiment of the present disclosure.

Optionally, the plurality of first light-diffusing units 2 disposed on the light incident surface 11 of the light guide 1 may be arranged in an arc. Further alternatively, the plurality of second light-diffusing units 3 in the light-diffusing structure 4 of the light guide plate 1 may be arranged in an arc. As shown in FIGS. 7 and 8, FIG. 7 is a schematic structure view of a plurality of first light-diffusing units arranged in an arc as provided by an embodiment of the present disclosure; and FIG. 8 is a schematic structure view of a plurality of first light-diffusing units arranged in a straight line as provided by an embodiment of the present disclosure. Assuming that an incident angle is $\alpha$, a refractive angle is $\beta$, and a deflection angle of the refracted light with respect to the incident light is $\theta$. Similarly, the refraction index of the light guide plate is assumed to be n. In this case, as can be known from the law of refraction and the drawings:

$$\sin \alpha = n \times \sin \beta; \quad \text{formula (1)}$$

$$\theta = \alpha - \beta; \quad \text{formula (2)}$$

As can be deduced from the above:

$$\theta = \alpha - \arcsin(\sin \alpha/n); \quad \text{formula (3)}$$

The following can be derived from the derivation formulae of trigonometric functions: $\theta' = 1 - \cos \alpha / \sqrt{n^2 - \cos^2 \alpha} > 0$. As can be seen, $\theta$ is an increasing function, where $\theta$ increases as $\alpha$ increases and decreases as $\alpha$ decreases.

In other words, for incident light from a same direction (a primary emission direction of the LED light), with a decrease in an angle enclosed by the normal and the horizontal plane, the angle $\alpha$ increases, and the angle $\theta$ increases too. In this way, the greater the deflection angle of the exit light is, the stronger light-diffusion effect the light-diffusing unit will have. As clearly known, an arrangement of the light-diffusing units in an arc is favorable for the diffusion effect of the light.

In order to better improve the light exit uniformity of the light guide plate 1, as optional approaches, each of the hollow light-diffusing structures may preferably have a depth of 0.5 mm-0.6 mm in a direction facing away from the light incident surface 11.

Figure 10:
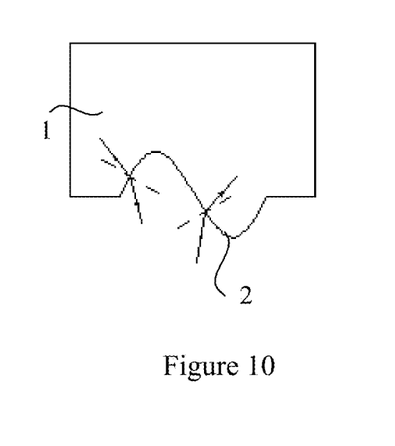
FIG. 10 is a schematic structure view of a first light-diffusing unit on a light incident surface of a light guide plate as provided in another embodiment of the present disclosure.
Figure 11:
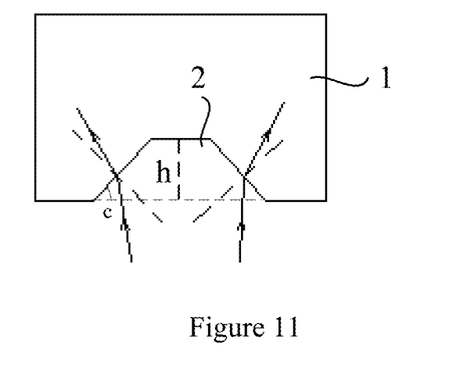
FIG. 11 is a schematic structure view of a first light-diffusing unit on a light incident surface of a light guide plate as provided in yet another embodiment of the present disclosure.
Figure 12:
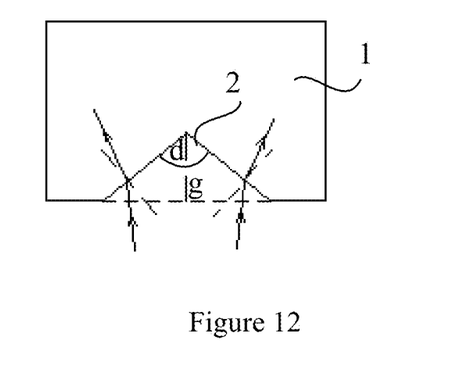
FIG. 12 is a schematic structure view of a first light-diffusing unit on a light incident surface of a light guide plate as provided in still another embodiment of the present disclosure.

Specific shapes of each of the first light-diffusing units 2 can be many and various. As shown in FIGS. 9, 10, 11 and 12, FIG. 9 is a schematic structure view of a first light-diffusing unit on a light incident surface of a light guide plate as provided in an embodiment of the present disclosure; FIG. 10 is a schematic structure view of a first light-diffusing unit on a light incident surface of a light guide plate as provided in another embodiment of the present disclosure; FIG. 11 is a schematic structure view of a first light-diffusing unit on a light incident surface of a light guide plate as provided in yet another embodiment of the present disclosure; and FIG. 12 is a schematic structure view of a first diffusing unit on a light incident surface of a light guide plate as provided in still another embodiment of the present disclosure.

Each of the first light-diffusing units 2 may comprise a microstructure. Moreover, a projection of each of the first light-diffusing units 2 on a plane (for example, the section as shown in the drawings) perpendicular to the light incident surface 11 of the light guide plate 1 may comprise at least one of the following shapes: a circular arc, an isosceles triangle, an isosceles trapezoid and a curve.

Figure 9:
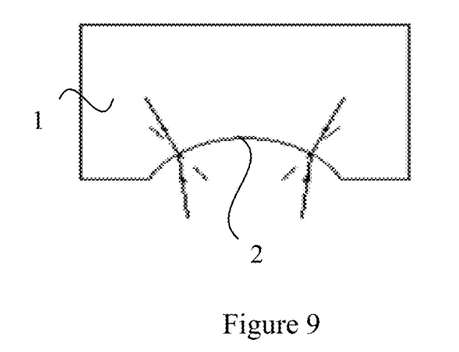
FIG. 9 is a schematic structure view of a first light-diffusing unit on a light incident surface of a light guide plate as provided in an embodiment of the present disclosure.

When the projection of the first light-diffusing units 2 on the plane perpendicular to the light incident surface 11 of the light guide plate 1 comprises a circular arc shape, as shown in FIG. 9, the projection of the circular arc shape may have a radius of 0.05 mm-0.06 mm.

Alternatively, when the projection of the light-diffusing units 2 on the plane perpendicular to the light incident surface 11 of the light guide plate 1 comprises a curve shape, as shown in FIG. 10, the projection of the curve shape may satisfy the following sinusoidal function: y=e·sin (f·φ), wherein e takes a value of 0.04 mm-0.06 mm, and f takes a value of 1-4.

Alternatively, when the projection of the light-diffusing units 2 on the plane perpendicular to the light incident surface 11 of the light guide plate 1 comprises an isosceles trapezoid shape, as shown in FIG. 11, the projection of the isosceles trapezoid shape may have a base angle c of 30°-60° and a height h of 0.03 mm-0.05 mm.

Alternatively, when the projection of the light-diffusing units 2 on the plane perpendicular to the light incident surface 11 of the light guide plate 1 comprises an isosceles triangle shape, the projection of the isosceles triangle shape may have a top angle d of 60°-70° and a height g of 0.03 mm-0.04 mm.

With definitions of the above parameters, the light-diffusion effect of the light-diffusing units can be further improved.

Figure 13:
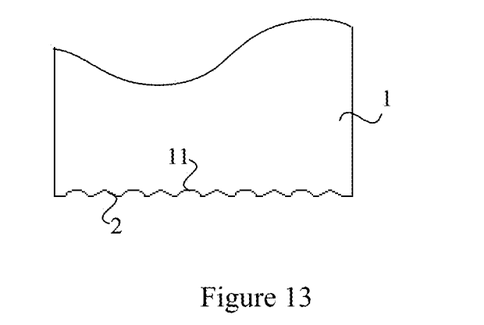
FIG. 13 is a schematic structure view of a plurality of first light-diffusing units on a light incident surface of a light guide plate as provided in an embodiment of the present disclosure.

Referring to FIG. 13, FIG. 13 is a schematic structure view of a plurality of first light-diffusing units on a light incident surface of a light guide plate as provided in an embodiment of the present disclosure. In a specific embodiment, the plurality of first light-diffusing units 2 disposed on the light incident surface 11 of the light guide plate 1 may have different shapes. Besides, the plurality of second light-diffusing units 3 in the light-diffusing structure 4 may have different shapes too. By using the first light-diffusing units 2 and the second light-diffusing units 3 of different shapes in combination, the light exit uniformity of the light guide plate 1 can be further improved.

The present disclosure further provides a backlight module comprising: light sources 5, and any light guide plate 1 as mentioned above. Since the above light guide plate 1 has high light exit uniformity, the backlight module provided in the present disclosure also has high light exit uniformity.

Furthermore, in view of the fact that the first light-diffusing units 2 are disposed on the light incident surface 11 of the light guide plate 1, and in the purpose of preventing light emitted by the light sources 5 from being emitted out before entering the image display region and becoming invalid light, the backlight module further comprises: a back plate located on a side of the light sources 5 facing away from the light guide plate. In addition, a reflective layer may also be disposed on a side of the back plate facing the light sources 5. The reflective layer can be coated on a side of a light-diffusion sheet abutting the light guide plate, extending to the hollow light-diffusing structure and completely covering an upper part of the light incident surface. Alternatively, the reflective layer can also be coated on an extended segment of a flexible circuit board, and it also needs to completely cover the upper part of the light incident surface.

In a specific embodiment, each light source 5 may be selected to be an LED lamp.

The present disclosure further provides a display device, comprising: a display panel and any backlight module as mentioned above. Since the above backlight module has good light exit uniformity, the display panel provided in the present disclosure also has good light exit uniformity.

The display device can be any product or component having a display function, such as a notebook computer display screen, electronic paper, a liquid crystal display, a liquid crystal TV, a digital photo frame, a handset, a tablet computer and the like.

Obviously, those skilled in the art can make various modifications and variations to the present disclosure without deviating from spirits and scopes of the present disclosure. Thus, if these modifications and variations to the present disclosure fall within the scopes of those claims of the present disclosure and the equivalent techniques thereof, the present disclosure is intended to include them too.

The invention claimed is:

1. A light guide plate, wherein
a plurality of first light-diffusing units is disposed on a light incident surface of the light guide plate, and
at least one light-diffusing structure is disposed in a set region within the light guide plate in a direction facing away from the light incident surface; and wherein
the light-diffusing structure comprises hollow light-diffusing structures, and
a plurality of second light-diffusing units is disposed on at least one of the following: a surface of the hollow light-diffusing structures facing the light incident surface, and a surface of the hollow light-diffusing structures facing away from the light incident surface.

2. The light guide plate according to claim 1, wherein
the set region is in a length range of 1.2 mm-2.8 mm from the light incident surface.

3. The light guide plate according to claim 1, wherein
each of the hollow light-diffusing structures has a depth of 0.5 mm-0.6 mm in a direction facing away from the light incident surface.

4. The light guide plate according to claim 1, wherein
the hollow light-diffusing structures comprise a single hollow light-diffusing structure disposed in an arrangement direction of a plurality of light sources, the plurality of light sources being configured to provide light incident on the light incident surface of the light guide plate, and
the single hollow light-diffusing structure having a length greater than or equal to a total arrangement length of the plurality of light sources in the arrangement direction of the plurality of light sources.

5. The light guide plate according to claim 1, wherein
the hollow light-diffusing structures and the plurality of light sources are the same in number and have one-to-one correspondence to each other in position, the plurality of light sources being configured to provide light incident on the light incident surface of the light guide plate.

6. The light guide plate according to claim 1, wherein
the plurality of first light-diffusing units disposed on the light incident surface of the light guide plate is arranged in an arc.

7. The light guide plate according to claim 6, wherein
each of the first light-diffusing units comprises a microstructure, and
a projection of each of the first light-diffusing units on a plane perpendicular to the light incident surface of the light guide plate comprises at least one of the following shapes: a circular arc, an isosceles triangle, an isosceles trapezoid and a curve.

8. The light guide plate according to claim 7, wherein
when the projection of the first light-diffusing units on the plane perpendicular to the light incident surface of the light guide plate comprises a circular arc shape, the projection of the circular arc shape has a radius of 0.05 mm-0.06 mm.

9. The light guide plate according to claim 7, wherein
when the projection of the first light-diffusing units on the plane perpendicular to the light incident surface of the light guide plate comprises a curve shape, the projection of the curve shape satisfies the following sinusoidal function: y =e·sin (f·φ), wherein e takes a value of 0.04 mm-0.06 mm, and f takes a value of 1 -4.

10. The light guide plate according to claim 7, wherein when the projection of the first light-diffusing units on the plane perpendicular to the light incident surface of the light guide plate comprises an isosceles trapezoid shape, the projection of the isosceles trapezoid shape has a base angle of 30° -60° and a height of 0.03 mm-0.05 mm.

11. The light guide plate according to claim 7, wherein when the projection of the first light-diffusing units on the plane perpendicular to the light incident surface of the light guide plate comprises an isosceles triangle shape, the projection of the isosceles triangle shape has a top angle of 60° -70° and a height of 0.03 mm-0.04 mm.

12. The light guide plate according to claim 7, wherein the plurality of first light-diffusing units disposed on the light incident surface of the light guide plate has different shapes, and
the plurality of second light-diffusing units in the light-diffusing structure has different shapes.

13. The light guide plate according to claim 1, wherein the plurality of second light-diffusing units in the light-diffusing structure of the light guide plate is arranged in an arc.

14. A backlight module, comprising:
a plurality of light sources, and
the light guide plate according to claim 1,
wherein the plurality of light sources is configured to provide light incident on the light incident surface of the light guide plate.

15. The backlight module according to claim 14, further comprising:
a back plate located on a side of the light sources facing away from the light guide plate, wherein a reflective layer is disposed on a side of the back plate facing the light sources.

16. The backlight module according to claim 14, wherein each of the light sources is an LED lamp.

17. A display device, comprising:
a display panel, and
the backlight module according to claim 14.

18. The backlight module according to claim 14, wherein the set region is in a length range of 1.2 mm-2.8 mm from the light incident surface.

* * * * *